No. 720,765. PATENTED FEB. 17, 1903.
A. WEBSTER.
SUPPORT AND CLEANER FOR PENS AND COMPOUND FOR SAME.
APPLICATION FILED DEC. 29, 1900.
NO MODEL.

Witnesses
J. R. Sackett
S. Sweeney

Inventor
Allen Webster

UNITED STATES PATENT OFFICE.

ALLEN WEBSTER, OF SPRINGFIELD, MASSACHUSETTS.

SUPPORT AND CLEANER FOR PENS AND COMPOUND FOR SAME.

SPECIFICATION forming part of Letters Patent No. 720,765, dated February 17, 1903.

Application filed December 29, 1900. Serial No. 41,443. (No model.)

*To all whom it may concern:*

Be it known that I, ALLEN WEBSTER, a citizen of the United States of America, and a resident of Springfield, in the county of Hampden and State of Massachusetts, have invented new and useful Improvements in Supports and Cleaners for Pens and New Compounds for the Same, of which the following is a specification, reference being had to the accompanying drawings and letters of reference marked thereon.

The object of my invention is to provide a material for a pen cleaner and support, so that when the pen while in the holder is thrust into it the pen and holder will be maintained in the position or substantially in the position in which it is left, so that, if desired, the penholder may be kept in a substantially vertical position, whereby a combined holder, cleaner, and a paper-weight results and whereby the advantages hereinafter set forth are attained.

Figure 1:
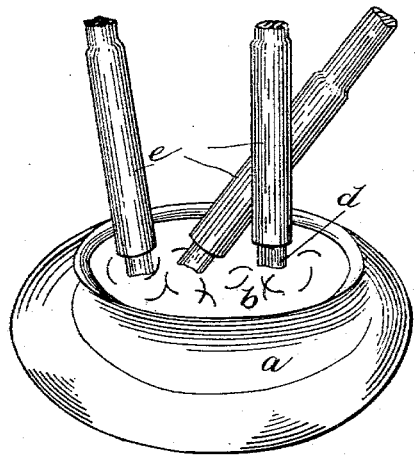
Figure 2:
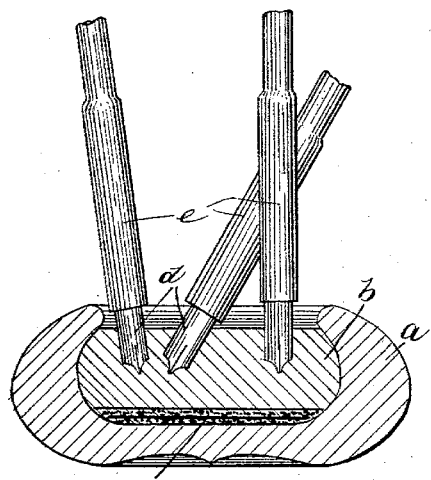

In the drawings, Figure 1 is a perspective view of a receptacle with a plastic material therein. Fig. 2 is a side elevation of the same in section, showing also an extra absorbent below the plastic material.

In detail, *a* indicates the receptacle, which may be of any suitable shape or material; *b*, a plastic compound therein; *c*, an extra-rapid absorbent, preferably blotting-paper; *d*, pens, and *e* ordinary penholders.

Heretofore various devices have been employed as a pen-support, comprising principally paper, shot, hair-brushes, and potatoes, all of which readily clog and become saturated or covered with ink, and hence objectionable and inoperative. A potato is by far the best of those heretofore used; but the life of a potato as a pen support and cleaner is limited to a few days at most, and potatoes are often difficult or at least inconvenient to procure.

In carrying out my invention I employ a plastic compound preferably composed of potters' clay, glycerin, plumbago, and flour of emery. It will, however, be seen that a fairly good substitute may be made with any material that will produce a plastic compound of sufficient stiffness to maintain the pen and holder in the desired position. Thus far I have attained the best results by the employment of a mixture of potters' clay and glycerin thoroughly mixed and worked to a stiff plastic mass and with a small percentage of plumbago mixed into the mass, sufficient very fine plumbago being employed to color the whole mass, and I find it advantageous to intermix a small quantity of flour of emery, especially when the clay employed does not work to the desired stiffness. The exact proportions cannot be given, because there are differences in clays, some clays being capable of working to a greater degree of stiffness than others. Enough plumbago, however, to color the whole mass overcomes the tendency of the plastic compound to stick to the pen, and about the same proportion, in bulk, of flour of emery (or any fine powder of like structure—for instance, very finely ground stone or slate) overcomes the elastic tendency of the mass, or, in other words, makes it stiffer.

It will be seen that various mixtures may be employed to produce a stiff plastic compound into which the pen may be plunged without injury, so that I do not limit myself to the compound set forth herein as the best. Such compound, however, has thus far proved to be the best in view of economy in cost of manufacture, convenience in mixing, and manipulation.

If glycerin is used in the mixture, it will at times be found that the excess will gradually come to the surface, and to avoid this and also to prevent the ink remaining on or near the surface of the mass I prefer to employ a rapid absorbent in connection with the plastic material, and I find that ordinary blotting-paper will accomplish the desired result. The absorbent, however, is not necessary to the success of the plastic material as a support and cleaner; but when an absorbent is employed the holder will present a more neat appearance longer than when an absorbent is not employed.

When the upper portion of the plastic compound becomes quite thoroughly saturated with ink, a large portion of it can be removed by pressing ordinary blotting-paper against the surface of the part so saturated and permitting it to remain in close contact therewith for a short time, as it, having a greater absorbing capacity than the plastic material, will draw the ink gradually from the compound.

The better method of mixing is to add sufficient water to make a soft mass which can be easily stirred, and afterward the surplus water can be driven off by heating, preferably in a water-bath.

Having therefore described my invention, what I claim, and desire to secure by Letters Patent, is—

1. A support and wiper for pens comprising a normally plastic material formed of a clayey material and a non-volatile liquid, and a suitable receptacle for the same.

2. As a pen support and cleaner the combination of a receptacle and a normally plastic material formed of a clayey material, a powdered solid lubricant and a non-volatile liquid.

3. A pen support and cleaner substance comprising a normally plastic material and a non-volatile ink-absorbent in combination, substantially as stated.

4. As a compound for a pen support and cleaner, clay and a non-volatile liquid intermixed to the proper stiffness.

5. As a pen cleaning and supporting substance, a normally plastic material formed of potters' clay and glycerin.

6. A pen cleaning and supporting plastic compound formed of clay, glycerin and plumbago.

7. A pen cleaning and supporting normally plastic compound formed of clay, glycerin and a powdered solid stiffening material.

8. As a support and cleaner for pens, a compound normally plastic, and having flour of emery intermixed therewith.

9. As a pen cleaner and support, a normally plastic compound consisting of a clayey substance intermixed with a liquid non-volatile at a low temperature.

10. The combination of a receptacle, a plastic compound therein and a rapid absorbent below the plastic material, substantially as shown.

ALLEN WEBSTER.

Witnesses:
S. SWEENEY,
J. R. SACKETT.